(12) United States Patent
Hirozawa et al.

(10) Patent No.: US 10,165,547 B2
(45) Date of Patent: Dec. 25, 2018

(54) STATE CHANGE NOTIFICATION DEVICE, WEARABLE COMMUNICATION DEVICE AND STATE CHANGE NOTIFICATION METHOD

(71) Applicant: Sharp Kabushiki Kaisha, Sakai, Osaka (JP)

(72) Inventors: Keiji Hirozawa, Sakai (JP); Michiaki Satou, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/507,783

(22) PCT Filed: Sep. 29, 2015

(86) PCT No.: PCT/JP2015/077531
§ 371 (c)(1),
(2) Date: Mar. 1, 2017

(87) PCT Pub. No.: WO2016/052513
PCT Pub. Date: Apr. 7, 2016

(65) Prior Publication Data
US 2017/0289956 A1    Oct. 5, 2017

(30) Foreign Application Priority Data
Sep. 30, 2014   (JP) .................... 2014-202220

(51) Int. Cl.
*H04W 12/02* (2009.01)
*H04W 68/02* (2009.01)
*H04M 1/00* (2006.01)

(52) U.S. Cl.
CPC ............ *H04W 68/02* (2013.01); *H04M 1/00* (2013.01); *H04W 12/02* (2013.01); *H04W 68/025* (2013.01)

(58) Field of Classification Search
None
See application file for complete search history.

(56) References Cited

U.S. PATENT DOCUMENTS 8,180,440 B2 * 5/2012 McCombie .......... A61B 5/0205
  600/513
8,364,250 B2 * 1/2013 Moon .................. A61B 5/0002
  600/513
8,419,649 B2 * 4/2013 Banet ................. A61B 5/02125
  600/485

FOREIGN PATENT DOCUMENTS

JP    11-298566 A    10/1999
JP    2004-147263 A    5/2004
(Continued)

OTHER PUBLICATIONS

Official Communication issued in International Patent Application No. PCT/JP2015/077531, dated Dec. 22, 2015.

*Primary Examiner* — K. Wong
(74) *Attorney, Agent, or Firm* — Keating & Bennett, LLP

(57) ABSTRACT

An embodiment of the present invention not only protects user's privacy but also reliably notifies a user of a change in state of an external communication device. A state change notification device (1) includes: an information receiving section (11) that receives state change information in a case where a change in state occurs in a device (100, 200, 300, or 400) in which an external communication device (500) or the state change notification device (1) is provided; and an expansion control section (12) that controls inflation of a balloon (24) provided in a wristwatch-type communication device (100) so that an inner pressure of the balloon (24) will be a user-perceivable pressure.

9 Claims, 11 Drawing Sheets

(56) References Cited

FOREIGN PATENT DOCUMENTS

| | | |
|---|---|---|
| JP | 2005-269255 A | 9/2005 |
| JP | 2006-108872 A | 4/2006 |
| JP | 2010-213137 A | 9/2010 |

* cited by examiner

FIG. 5

| State of balloon | Amplitude [m] | | Duration time [s] |
| --- | --- | --- | --- |
| | Start of step | End of step | |
| Expanding step | 0 | $A_0$ | $T_1$ |
| User-perceiving step | $A_0$ | $A_0$ | $T_2$ |
| Contracting step | $A_0$ | 0 | $T_3$ |

FIG. 7

| Change in state of external communication device | Balloon | | Vibrator | |
|---|---|---|---|---|
| | Pressure increase rate [Pa/s] | User-perceivable pressure [Pa] | Amplitude [m] | Frequency [Hz] |
| Voice call reception | $P_{11}$ | $P_{21}$ | $A_1$ | $f_1$ |
| Mail reception | $P_{12}$ | $P_{22}$ | $A_2$ | $f_2$ |
| Alarm | $P_{13}$ | $P_{23}$ | $A_3$ | $f_3$ |
| Decrease in remaining battery level | $P_{14}$ | $P_{24}$ | $A_4$ | $f_4$ |
| Gripping | $P_{15}$ | $P_{25}$ | $A_5$ | $f_5$ |

FIG. 9

| First step | First pressure increase rate [Pa/s] | Pa |
|---|---|---|
| | First predetermined pressure [Pa] | $P_1$ |
| Second step | Second pressure increase rate [Pa/s] | Pb |
| | User-perceivable pressure [Pa] | $P_2$ |
| Third step | First pressure decrease rate [Pa/s] | Pc |
| | Second predetermined pressure [Pa] | $P_3$ |
| Fourth step | Second pressure decrease rate [Pa/s] | Pd |

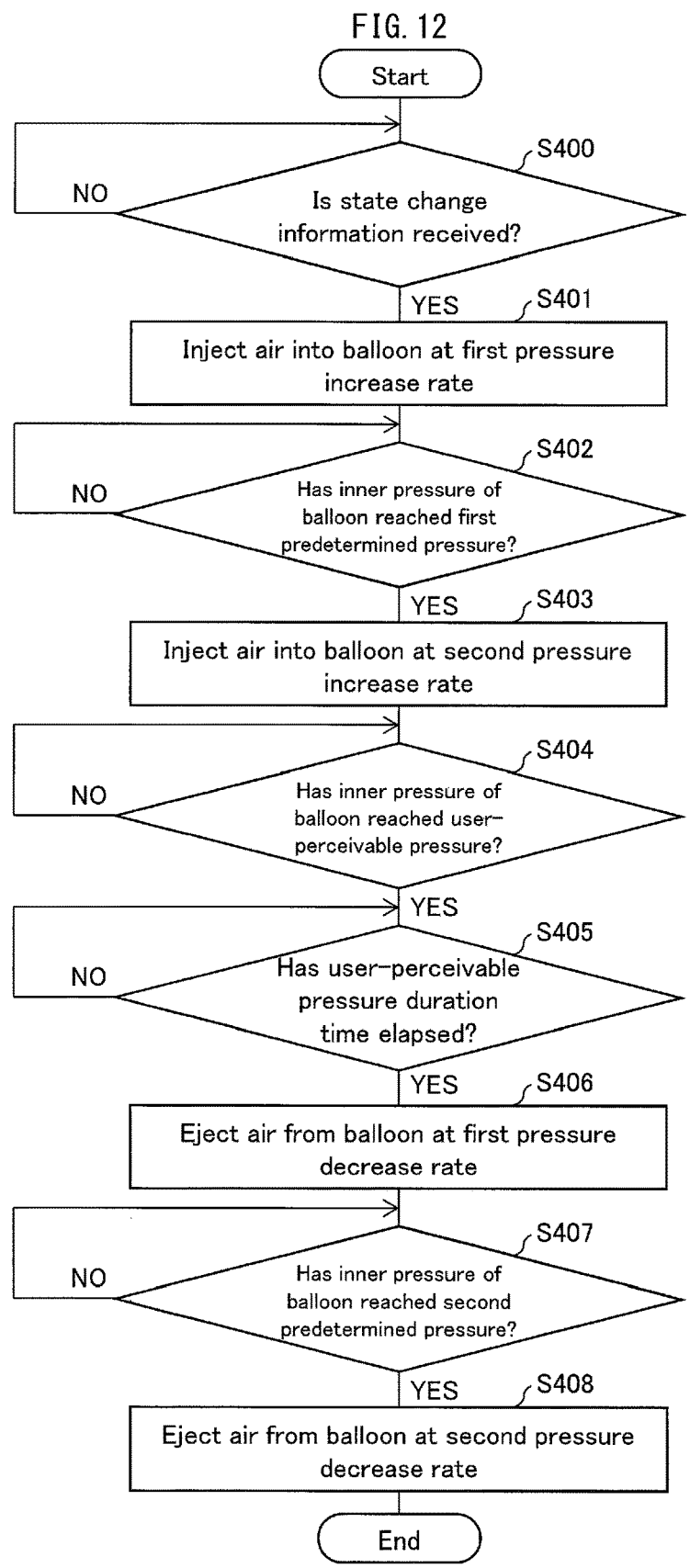

STATE CHANGE NOTIFICATION DEVICE, WEARABLE COMMUNICATION DEVICE AND STATE CHANGE NOTIFICATION METHOD

TECHNICAL FIELD

The present invention relate to a technique for notifying a user of a change in state of a communication device.

BACKGROUND ART

Conventionally, wearable communication-reception notification terminals have been widely used. The communication-reception notification terminals are each a terminal for notifying a user of a mobile phone that the mobile phone has received a call, a mail, and/or the like. For example, Patent Literature 1 discloses a communication-reception notification terminal which is integrated in an accessory and is wearable on a user. This communication-reception notification terminal includes a control section which controls a sound section, a vibration section, or a light emitting section. Having received communication-reception information from a mobile phone via a Bluetooth communication reception section and determined that a communication has been received, the control section (i) controls the sound section so as to cause a buzzer to sound in a case where the sound section is selected as a communication-reception notification section for an operation at the time of reception of a communication, (ii) controls the vibration section so as to cause a vibrator to vibrate in a case where the vibration section is selected as the communication-reception notification section, or (iii) controls the light emitting section so as to cause an LED to blink in a case where the light emitting section is selected as the communication-reception notification section.

CITATION LIST

Patent Literature

[Patent Literature 1] Japanese Patent Application Publication Tokukai No. 2010-213137 (Publication date: Sep. 24, 2010)

SUMMARY OF INVENTION

Technical Problem

However, in a case where the communication-reception notification terminal disclosed in Patent Literature 1 notifies reception of a communication by, for example, sounding of a buzzer or blinking of an LED, unintentionally, a third person is highly likely to recognize the reception of a communication. On the other hand, a user may not be able to recognize the reception of a communication due to influence of noise or brightness in a surrounding environment. In other words, the above communication-reception notification terminal has problems in whether user's privacy is protected and in whether a user is reliably notified.

The same applies to a case where a mobile phone itself notifies a user of reception of a communication by sounding of a buzzer or blinking of an LED.

Solution to Problem

In order to solve the above problems, a state change notification device in accordance with an embodiment of the present invention is a state change notification device for notifying a user, by use of a wearable communication device, of a change in state of a device in which an external communication device or the state change notification device is provided, the state change notification device comprising: an information receiving section for receiving state change information on a change in state in a case where the change in state occurs in the device in which the external communication device or the state change notification device is provided; and an expansion control section for controlling expansion of an expandable section that is provided in contact with a part of user's body in the wearable communication device, the expansion control section controlling expansion of the expandable section in accordance with the state change information received by the information receiving section, so as to cause an inner pressure of the expandable section to become a user-perceivable pressure, the user-perceivable pressure being a set pressure that allows a user to perceive expansion of the expandable section.

Advantageous Effects of Invention

An embodiment of the present invention makes it possible not only to protect user's privacy but also to allow a user to be reliably notified of a change in state of an external communication device.

Figure 3:
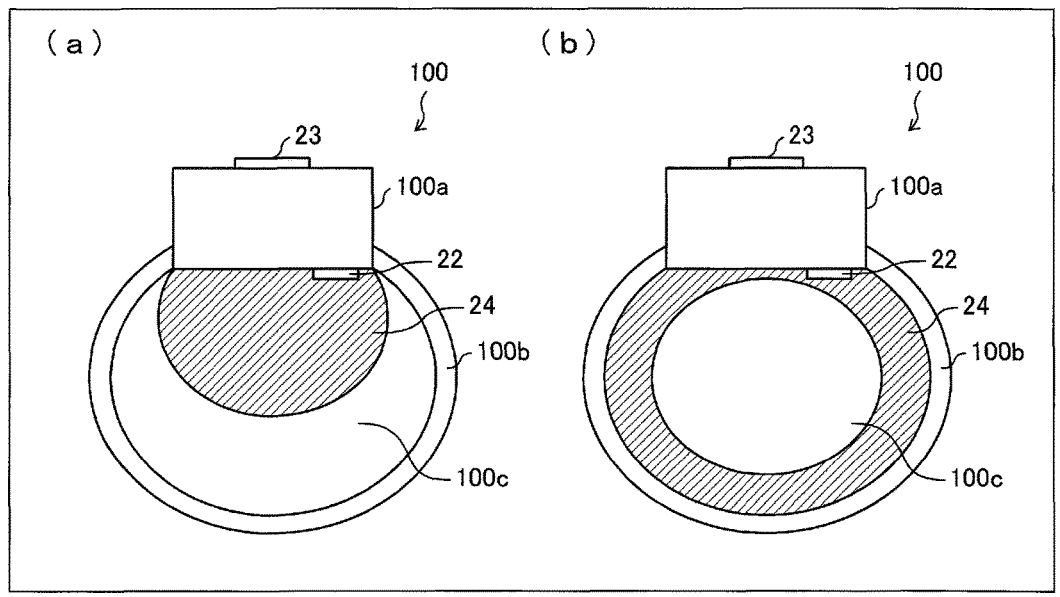

(a) of FIG. 3 is a view schematically illustrating an example of the wearable communication device. (b) of FIG. 3 is a view schematically illustrating another example of the wearable communication device.

Figure 4:
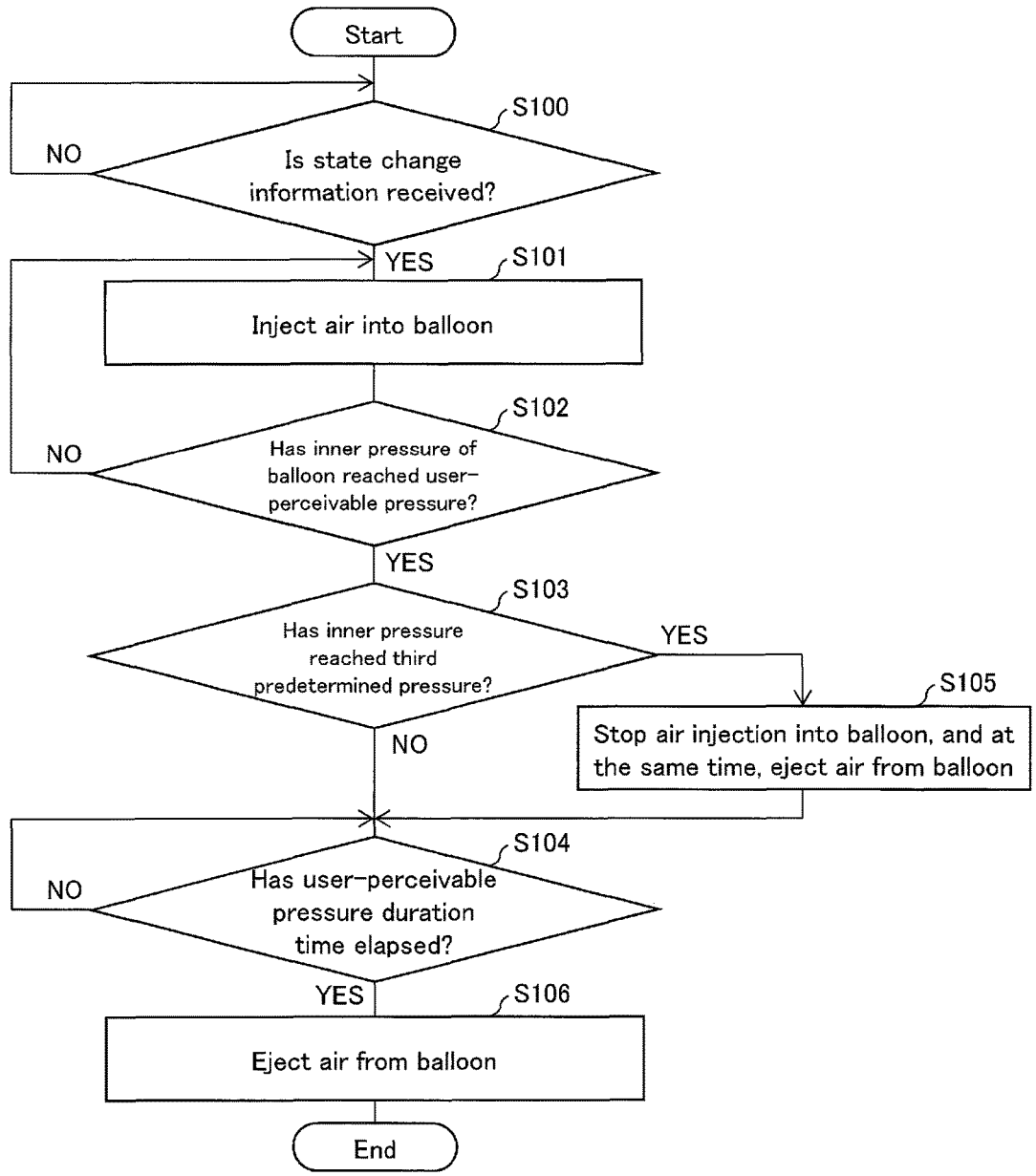

FIG. 4 is a flowchart showing a method of controlling inflation and deflation of a balloon by a state change notification device in accordance with Embodiment 1 of the present invention.

FIG. 5 shows an example of a vibration table stored in a storage section of a wearable communication device in accordance with Embodiment 2 of the present invention.

Figure 6:
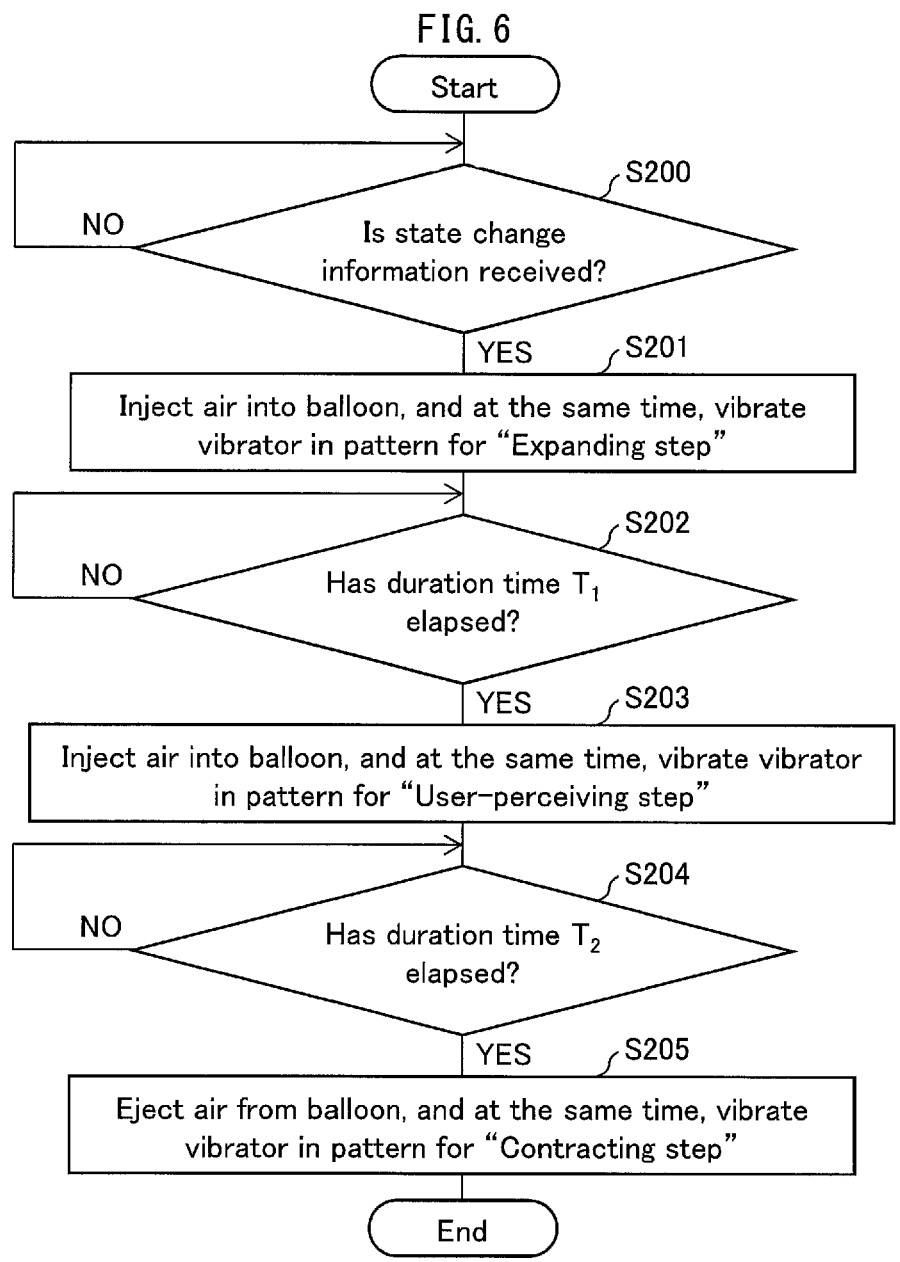

FIG. 6 is a flowchart showing a method of controlling inflation/deflation of a balloon and vibration of a vibrator by a state change notification device in accordance with Embodiment 2 of the present invention.

FIG. 7 shows an example of a state change notification table stored in a storage section of a wearable communication device in accordance with Embodiment 3 of the present invention.

Figure 8:
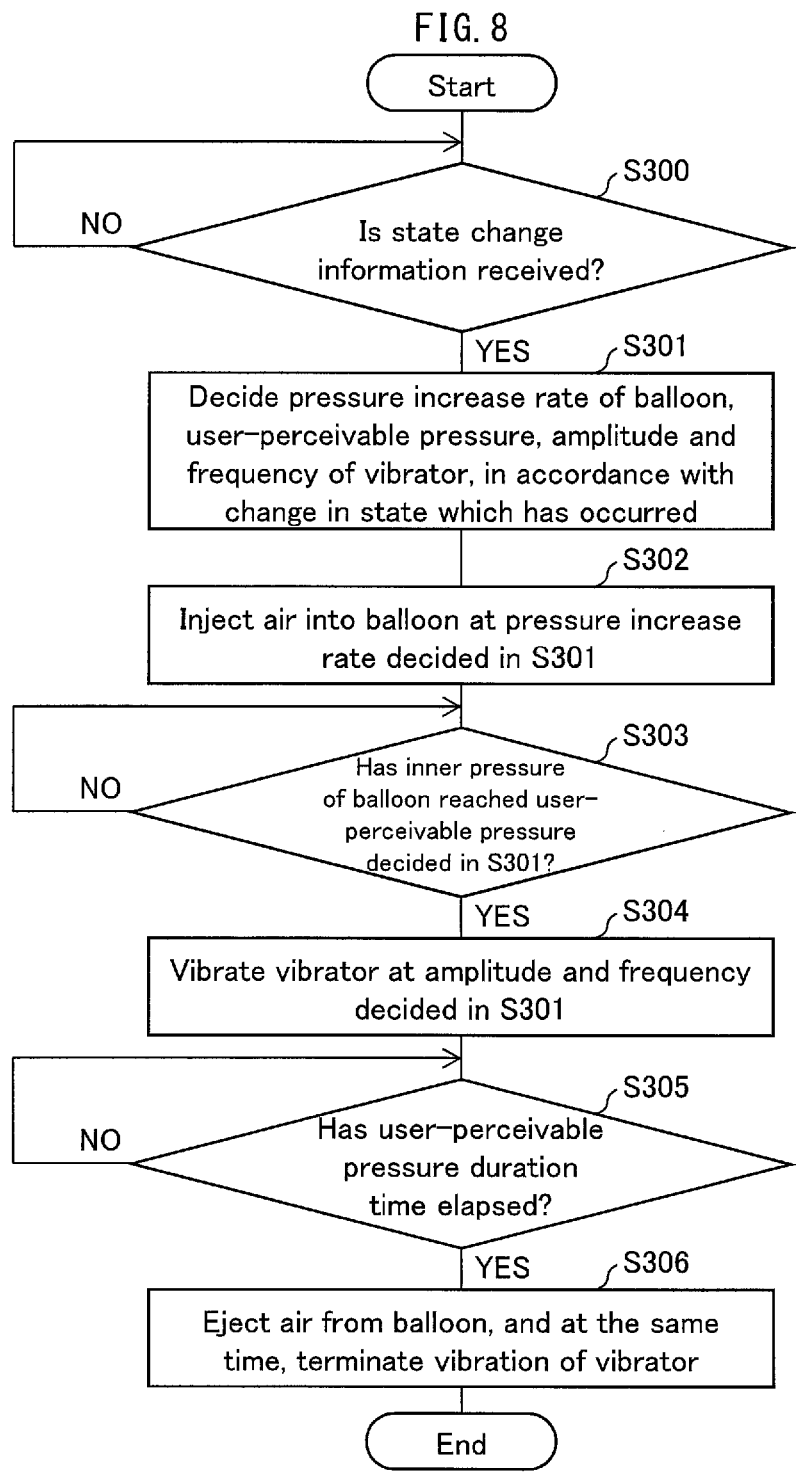

FIG. 8 is a flowchart showing a method of controlling, in accordance with a type of change in state, inflation/deflation of a balloon and vibration of a vibrator by a state change notification device in accordance with Embodiment 3 of the present invention.

FIG. 9 shows an example of a pressure table stored in a storage section of a wearable communication device in accordance with Embodiment 4 of the present invention.

Figure 10:
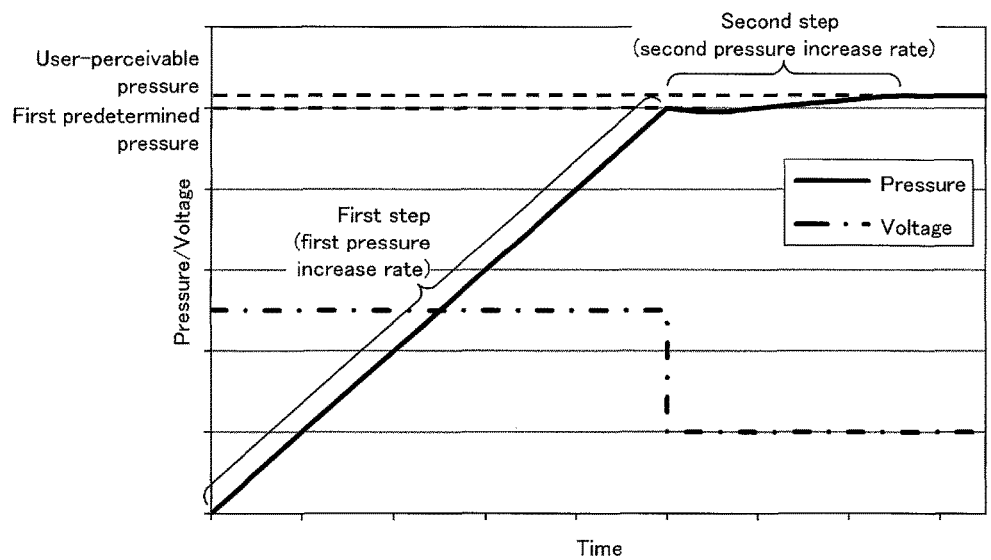

FIG. 10 is a graph showing a relationship between inner pressure of a balloon and voltage applied to a micro-blower (in the case of the step of inflating a balloon) in the wearable communication device.

Figure 11:
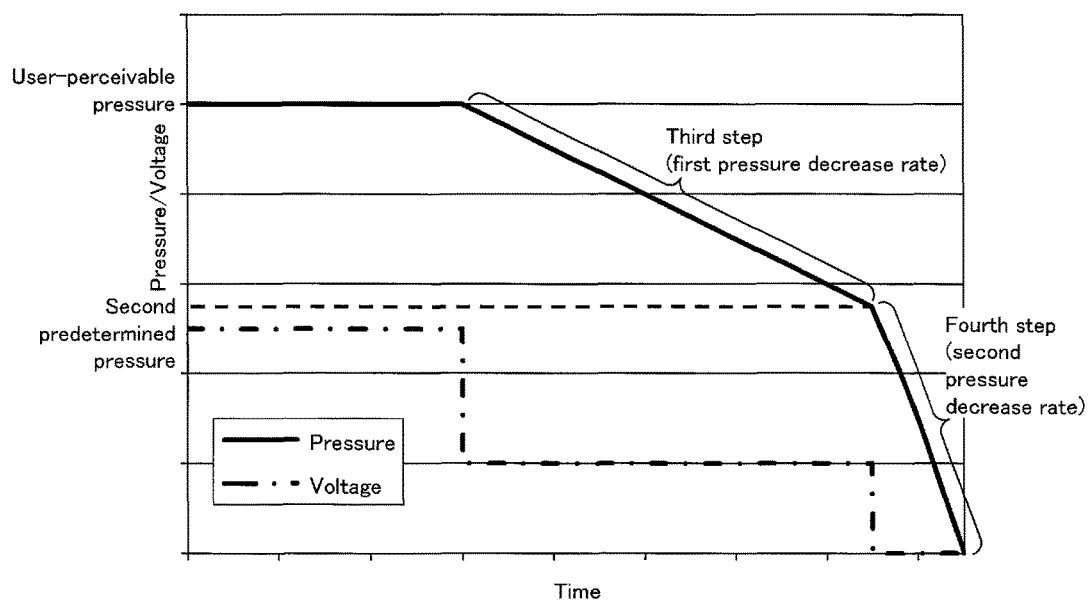

FIG. 11 is a graph showing a relationship between inner pressure of a balloon and voltage applied to a micro-blower (in the case of the step of deflating a balloon) in the wearable communication device.

FIG. 12 is a flowchart illustrating a method of controlling inflation and deflation of a balloon by a state change notification device in accordance with Embodiment 4 of the present invention.

DESCRIPTION OF EMBODIMENTS

Embodiment 1

The following discusses in detail an embodiment of the present invention, with reference to FIGS. 1 to 6. Embodiments including the present Embodiment 1 each discuss a state change notification device as a device provided in a wristwatch-type communication device which is wearable on a wrist of a user. Note that the state change notification device may be provided in a wearable communication device of any type such as a headphone type, a glasses type, a belt type, or a ring type. Further, examples of an external communication device in which a change in state occurs encompass not only smartphones, but also foldable mobile phones, mobile game machines, and the above-described wearable communication devices.

(General Description of Communication Device)

First, the following provides a brief overview of a wristwatch-type communication device 100 (wearable communication device), with reference to FIG. 3. (a) of FIG. 3 is a view schematically illustrating an example of the communication device 100. Meanwhile, (b) of FIG. 3 is a view schematically illustrating another example of the communication device 100. The communication device 100 has a wireless communication function. In a case where a change in state occurs in an external communication device 500 which similarly has a wireless communication function, the external communication device 500 transmits state change information on the above change in state and the communication device 100 receives the state change information via wireless communication. Then, the communication device 100 notifies a user of the change in state. The external communication device 500 will be discussed in detail later. The change in state of the external communication device 500 here encompasses not only changes in state caused by external factors such as voice call reception, mail reception, and gripping of the external communication device 500 by a user (whether or not the external communication device 500 is gripped and a change in force at which the external communication device 500 is gripped), but also changes in state caused by internal factors such as sounding of an alarm, turn-on of the TV, and decrease in remaining battery level. Note that wireless communication allowing for connection between the communication device 100 and the external communication device 500 may be near-range wireless communication via Bluetooth (registered trademark) or the like, or long-range wireless communication via wireless LAN or the like.

As illustrated in (a) of FIG. 3, the communication device 100 includes a main body 100a, a balloon 24 (expandable section), a first pressure sensor 22, a second pressure sensor 23 and a wristband 100b. The main body 100a contains therein various parts including a state change notification device 1 which will be discussed later. The wristband 100b is an expandable and contractable wristband-like member having a hollow part 100c. The hollow part 100c has a size which allows user's wrist to be fit in the hollow part and be in contact with the wristband 100b. The wristband 100b is provided to the main body 100 so that the main body 100 can be worn on a wrist of a user. The balloon 24 is an expandable and contractable balloon-like member. The balloon 24 is intended to notify a user of a change in state of the external communication device 500 by inflation caused by inflow of air. The balloon 24 is in a balloon form and provided so as to be in contact with a surface (hereinafter, referred to as an "inner surface") of the main body 100a which surface is on a side where the hollow part 100c is present. The first pressure sensor 22 is a member for detecting an inner pressure of the balloon 24, and provided on the inner surface of the main body 100a in such a manner that the first pressure sensor 22 is sandwiched between the main body 100a and the balloon 24. The second pressure sensor 23 is a member for detecting a pressure externally applied to the main body 100a in a case where a user grips the main body 100a or the like case. The second pressure sensor 23 is provided on another surface of the main body 100a which another surface is on an opposite side of the inner surface.

Note that in regard to the position and the shape of the balloon 24, the balloon 24 may have a wristband shape and may be provided so as to be in contact with not only the inner surface of the main body 100a but also a surface of the wristband 100b which surface is on a side where the hollow part 100c is present, as illustrated in (b) of FIG. 3. In other words, the position and the shape of the balloon 24 can be any position and any shape each of which allows a user to perceive inflation of the balloon 24. Further, the balloon 24 may be inflated or expanded by injection of gas other than air or fluid. Further, it is possible to use, other than the balloon 24, any member expandable to an extent that allows a user to perceive expansion of the member.

(Concrete Configuration of Communication Device and External Communication Device)

Figure 1:
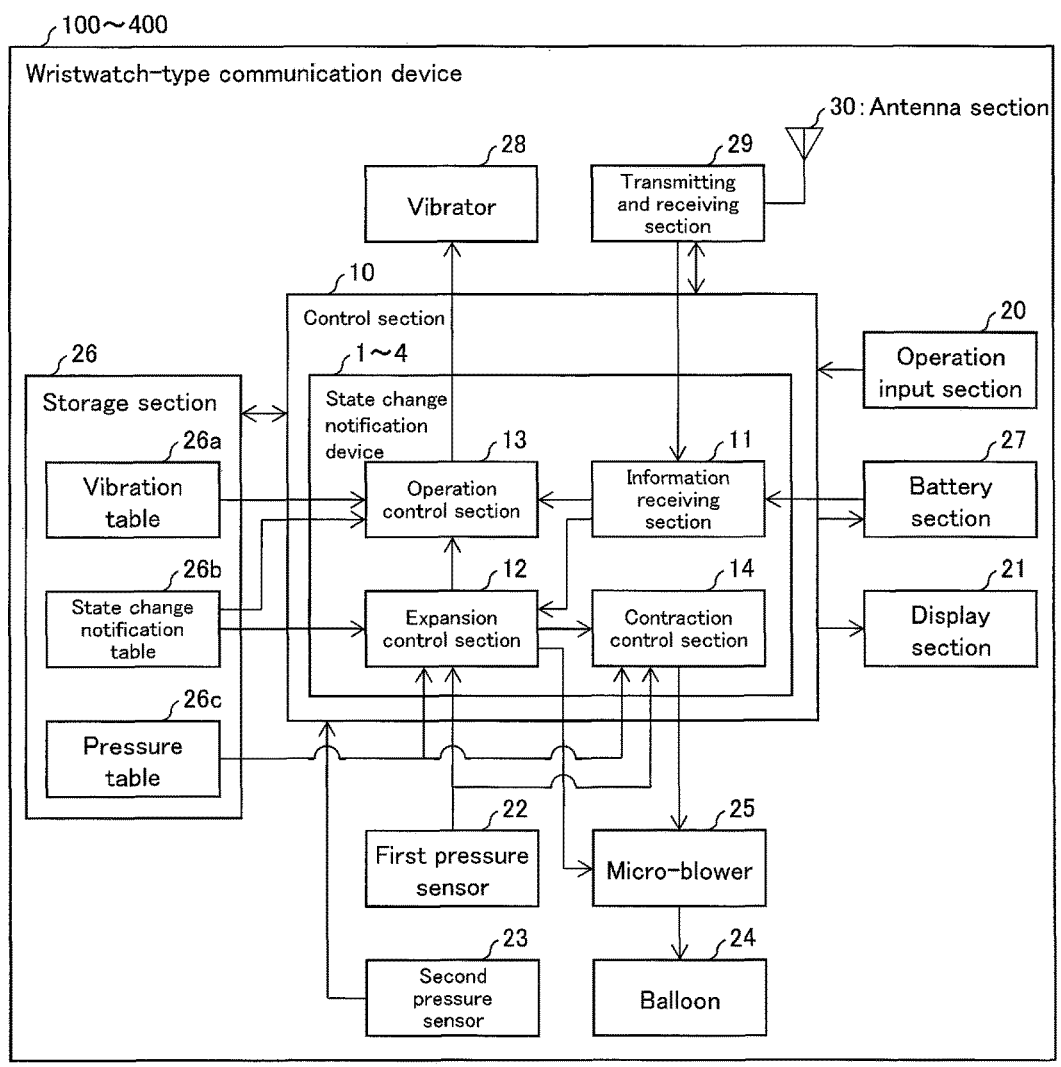
FIG. 1 is a block diagram schematically illustrating a wearable communication device in accordance with Embodiments 1 to 4 of the present invention.

Next, the following discusses a concrete configuration of the wristwatch-type communication device 100, with reference to FIG. 1. FIG. 1 is a block diagram illustrating a concrete configuration of the communication device 100. As illustrated in FIG. 1, the communication device 100 includes a control section 10, an operation input section 20, a display section 21, a first pressure sensor 22, a second pressure sensor 23, a balloon 24, a micro-blower 25, a storage section 26, a battery section 27, a transmitting and receiving section 29 and an antenna section 30. The control section 10 performs overall control of the communication device 100, and includes the state change notification device 1. The state change notification device 1 performs overall control of various kinds of processing for notifying a user of a change in state of the external communication device 500. The state change notification device 1 will be described in detail later.

The operation input section 20 accepts an operation performed by a user. The display section 21 displays various images such as images produced by execution of various functions (application software) installed in the communication device 100. The micro-blower 25 includes two valves for air injection and for air ejection, respectively, and injects/ejects air into/out of the balloon 24 by opening/closing the two valves. The micro-blower 25 is also provided with another valve for air passage which is connected with the balloon 24, and this valve is also used for air injection. The storage section 26 is a section for storing various control programs and/or the like which are to be executed by the control section 10. This storage section 26 is constituted by an involatile storage device such as a hard disk, a flash memory, or the like. The battery section 27 supplies power to each component part constituting the communication device 100. The transmitting and receiving section 29 transmits/receives various data via the antenna section 30. Note that since not only gas other than air but also fluid may be injected into the balloon 24, the micro-blower 25 is not an essential constituent element in the communication device 100.

Next, the following discusses a concrete configuration of the state change notification device 1. The state change notification device 1 includes an information receiving section 11, an expansion control section 12 and a contraction control section 14. The information receiving section 11 receives state change information transmitted from the external communication device 500 via the antenna section 30 and the transmitting and receiving section 29. Then, the information receiving section 11 transmits, to the expansion control section 12, information that the state change information has been received.

The expansion control section 12 causes the micro-blower 25 to operate so as to inflate the balloon 24, in accordance with the above information received from the information receiving section 11. Here, the micro-blower 25 is caused to inflate the balloon 24 so that the inner pressure of the balloon 24 will be a user-perceivable pressure which is set as a pressure that allows a user to perceive inflation of the balloon 24. Concretely, the expansion control section 12 applies voltage to the micro-blower 25 so that a power supply of the micro-blower 25 will be turned ON. Then, the valve for air injection is opened, so that air is injected into the balloon 24 through the valve for air injection via the another valve for air passage. Further, the expansion control section 12 causes the micro-blower 25 to operate in such a manner that: inflation of the balloon 24 is stopped when the inner pressure of the balloon 24 has reached a third predetermined pressure that is higher than the user-perceivable pressure; and then, the inflation is restarted when the internal pressure has decreased down to the user-perceivable pressure. Concretely, in a case where the first pressure sensor 22 detects that the inner pressure of the balloon 24 has reached the third predetermined pressure, the expansion control section 12 turns OFF the power supply of the micro-blower 25. This closes the valve for air injection, so that injection of air is stopped. Subsequently, when it is detected that the inner pressure has decreased down to the user-perceivable pressure, the expansion control section 12 applies voltage to the micro-blower 25 again. This turns ON the power supply of the micro-blower 25, so that the valve for air injection is re-opened. Consequently, injection of air into the balloon 24 is restarted. In addition, the expansion control section 12 measures a user-perceivable pressure duration time which is set as a time enough for a user to perceive the user-perceivable pressure. Then, when the user-perceivable pressure duration time has elapsed, the expansion control section 12 transmits such a time measurement result to the contraction control section 14. Note that the user-perceivable pressure and the user-perceivable pressure duration time may be set in advance during production of the communication device 100 and stored as data in the storage section 26, or alternatively, for example, may be arbitrarily set by a user through input via the operation input section 20. Further, the third predetermined pressure may also be set in advance or alternatively may be arbitrarily set by a user. However, when the third predetermined pressure is set, it is necessary to take into account a material of the balloon 24, a set value of the user-perceivable pressure, and the like so that no harm occurs to a user body due to burst or the like of the balloon 24.

In a case where the contraction control section 14 receives, from the expansion control section 12, the time measurement result that informs elapse of the user-perceivable pressure duration time, or in a case where the first pressure sensor 22 detects that the inner pressure of the balloon 24 has reached the third predetermined pressure, the contraction control section 14 causes the micro-blower 25 to operate so that the balloon 24 will deflate. Concretely, the contraction control section 14 opens the valve for air ejection, so that the air is ejected via the valve for air ejection. In a case where the balloon 24 is deflated when the inner pressure has reached the third predetermined pressure, the first pressure sensor 22 first detects that the inner pressure has reached the third predetermined pressure. Then, the expansion control section 12 closes the valve for air injection, and the contraction control section 14 opens the valve for air ejection. Subsequently, when the inner pressure is detected to have decreased down to the user-perceivable pressure and the expansion control section 12 re-opens the valve for air injection, the contraction control section 14 closes the valve for air ejection, so that the air ejection stops.

As described above, in a case where a change in state of the external communication device 500 is notified, the expansion control section 12 and the contraction control section 14 controls inflation and deflation of the balloon 24 so that the inner pressure of the balloon 24 is constantly kept not less than the user-perceivable pressure and not more than the third predetermined pressure. Note that in a case where the balloon 24 is deflated when the inner pressure of the balloon 24 has reached the third predetermined pressure, such deflation of the balloon 24 does not necessarily need to be stopped at a time point at which the inner pressure has decreased down to the user-perceivable pressure. For example, deflation of the balloon 24 may be stopped at a time point at which the inner pressure has decreased down to a safe pressure (pressure lower than the user-perceivable pressure) at which there is no risk of breakage of the balloon 24. The expansion control section 12 may be alternatively configured to deflate the balloon 24 to an initial state prior to inflation, and not to restart inflation of the balloon 24.

Figure 2:
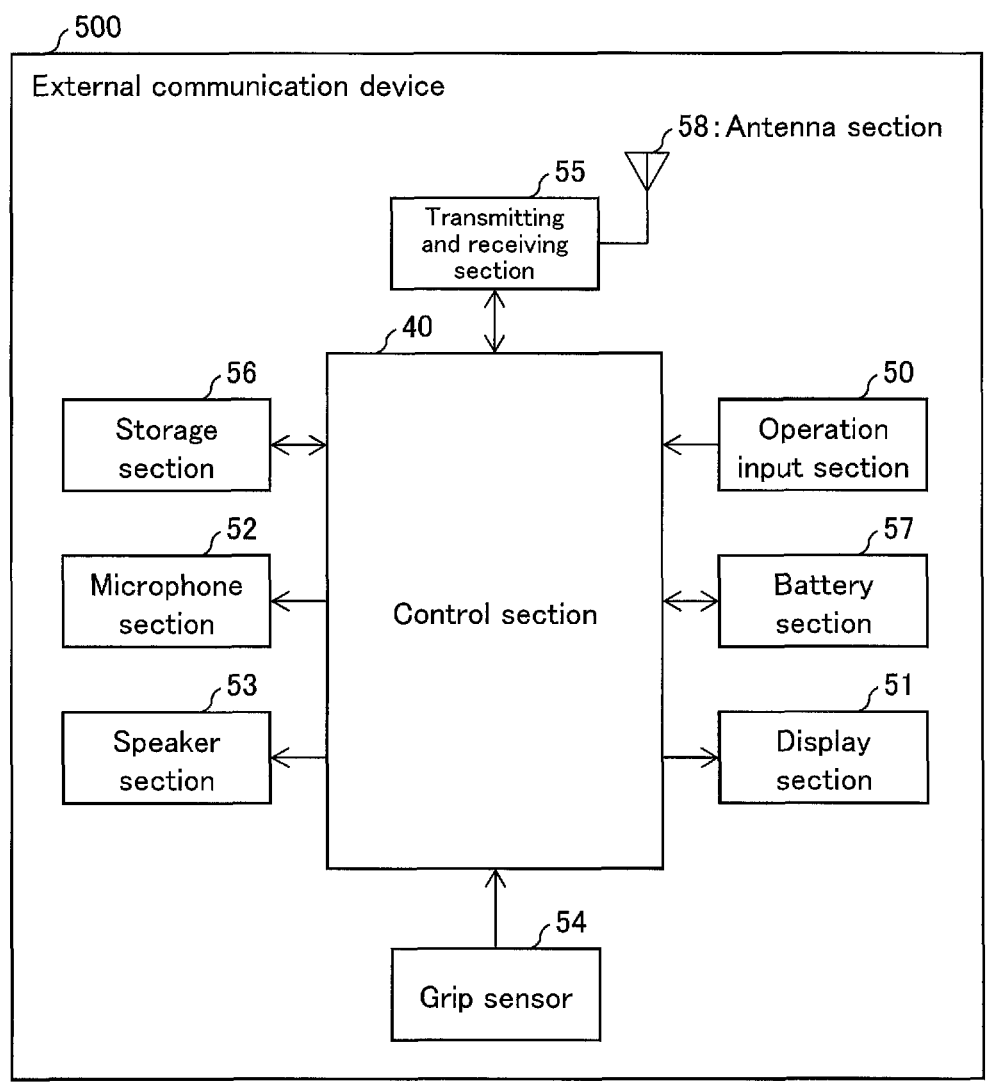
FIG. 2 is a block diagram schematically illustrating an external communication device in accordance with Embodiment 1 of the present invention.

Next, the following discusses a concrete configuration of the external communication device 500, with reference to FIG. 2. FIG. 2 is a block diagram illustrating a concrete configuration of the external communication device 500. Here, each member constituting the external communication device 500 and corresponding to a member constituting the communication device 100 (for example, an operation input section 50 of the external communication device 500 corresponds to the operation input section 20 of the communication device 100) has an identical function to that of the member constituting the communication device 100, and therefore, description thereof will be omitted. A microphone section 52 is, for example, a sound collector for collecting sounds during a phone call. A speaker section 53 is a reproducing section which has a function of reproducing information containing sound data and which includes a speaker for outputting sounds so that others in addition to a user can hear the sounds. A grip sensor 54 is a sensor for detecting that the external communication device 500 is gripped by a user. The grip sensor 54 is, for example, an electrostatic capacitive sensor or a pressure sensor. The grip sensor 54 is provided, for example, on a side surface of a housing that contains component parts constituting the external communication device 500 and that is substantially perpendicular to a display surface where a display section 51 is provided. Meanwhile, a transmitting and receiving section transmits state change information of the external communication device 500 to the communication device 100 via the antenna section 58. Such state change information indicates that a change in state has occurred, for example, a communication has been received, a remaining battery level has decreased, or a user has gripped the external communication device 500.

(Method of Controlling Inflation and Deflation of Balloon by State Change Notification Device)

Next, the following discusses a method of controlling inflation and deflation of the balloon 24 by the state change notification device 1, with reference to FIG. 4. FIG. 4 is a flowchart showing the control method. As shown in FIG. 4, first, in a case where the information receiving section 11 determines that state change information transmitted from the external communication device 500 has been received (YES in step 100 (step of receiving information or information reception step); hereinafter, abbreviated as Y in S100), the information receiving section 11 transmits this determination result to the expansion control section 12. Conversely, in a case where the information receiving section 11 determines that no state change information has been received (NO in S100; hereinafter, NO is abbreviated as "N"), the information receiving section 11 determines again whether state change information is received or not. Next, in a case where the expansion control section 12 receives the above determination result from the information receiving section 11, the expansion control section 12 causes the micro-blower 25 to operate so as to inflate the balloon 24 by injection of air into the balloon 24 (S101; the step of controlling expansion or expansion control step).

Next, the expansion control section 12 determines whether or not the inner pressure of the balloon 24 has reached the user-perceivable pressure on the basis of a detection result from the first pressure sensor 22 (S102; the step of controlling expansion or expansion control step). Then, in a case where a determination result in S102 is N, the expansion control section 12 determines again whether or not the internal pressure has reached the user-perceivable pressure. Conversely, in a case where the determination result in S102 is Y, the expansion control section 12 further determines whether or not the inner pressure has increased up to the third predetermined pressure on the basis of a detection result from the first pressure sensor 22 (S103). In a case where a determination result in S103 is Y, the expansion control section 12 causes the micro-blower 25 to operate so that air injection into the balloon 24 will be stopped (S105). At the same time, the contraction control section 14 causes the micro-blower 25 to operate so that the air inside the balloon 24 will be ejected from the balloon 24, until the inner pressure decreases down to the user-perceivable pressure (S105).

Next, in a case where the determination result in S103 is N or in a case where processing of S105 has been completed, the expansion control section 12 starts measuring a time from a time point at which the inner pressure of the balloon 24 has reached the user-perceivable pressure, and determines whether or not the user-perceivable pressure duration time has elapsed (S104). In a case where a determination result in S104 is Y, the expansion control section 12 transmits, to the contraction control section 14, the determination result that informs elapse of the user-perceivable pressure duration time. Conversely, in a case where the determination result in S104 is N, the expansion control section 12 determines again whether or not the user-perceivable pressure duration time has elapsed or not. Subsequently, when the contraction control section 14 receives the determination result from the expansion control section 12, the contraction control section 14 causes the micro-blower 25 to operate so that the air inside the balloon 24 will be ejected from the balloon 24 and thereby the balloon 24 will be deflated (S106).

Note that the above description provides an example in which in a case where the determination result in S103 is Y, the step shifts to S104 after the air injection into the balloon 24 has been stopped and the inner pressure has decreased down to the user-perceivable pressure by ejection of the air from inside the balloon 24. However, an embodiment of the present invention is not limited to such a configuration. As described above, deflation of the balloon 24 may be stopped at a time point at which the inner pressure has decreased down to a safe pressure (pressure lower than the user-perceivable pressure) at which there is no risk of breakage of the balloon 24. The expansion control section 12 may be alternatively configured to deflate the balloon 24 to an initial state prior to inflation, and not to restart inflation of the balloon 24.

(Effects)

As described above, in Embodiment 1, a change in state of the external communication device 500 is notified to a user by expansion of the balloon 24. Unlike notification by use of sound output of a buzzer or the like or light emission of an LED or the like, the above notification is not influenced by noise or brightness in a surrounding environment. Further, it is unlikely that a third person would recognize a change in state. Further, though a user who, for example, is moving by running may have difficulty in feeling vibration of a vibrator due to motion of the user himself/herself in a case where notification is made by the vibration, such a situation in the case of the notification by vibration is unlikely to occur. Accordingly, it is possible not only to protect user's privacy, but also to reliably notify a user of a change in state of the external communication device 500. Further, since the inner pressure of the balloon 24 is kept at a pressure equal to or less than the third predetermined pressure, it is possible to prevent breakage of the balloon 24, such as burst of the balloon 24, which is caused by an excessive increase in the inner pressure. This consequently makes it possible to ensure safety of a user.

Embodiment 2

The following discusses another embodiment of the present invention, with reference to FIGS. 1, 5 and 6. Note that for convenience of description, each member having the same function as a member described in Embodiment 1 will be given the same reference sign as the member described in Embodiment 1, and a description thereof will be omitted.

A state change notification device 2 in accordance with Embodiment 2 is different from the state change notification device 1 in accordance with Embodiment 1 in that the state change notification device 2 includes an operation control section 13. Further, as illustrated in FIG. 1, a wristwatch-type communication device 200 (wearable communication device) in accordance with Embodiment 2 is different from the wristwatch-type communication device 100 in accordance with Embodiment 1, in that the wristwatch-type communication device 200 includes a vibrator 28 (notification assisting section) and a vibration table 26a that is stored in a storage section 26.

The operation control section 13 controls vibration of the vibrator 28 with reference to the vibration table 26a as shown in FIG. 5, in a case where the operation control section 13 receives, from an information receiving section 11, information that state change information has been received. In the vibration table 26a, states of a balloon 24 are classified into an expanding step, a user perceiving step in which an inner pressure of the balloon 24 is kept at a user-perceivable pressure, and a contracting step. Further, the vibration table 26a associates amplitudes of the vibrator 28 with a duration time ($T_1$ to $T_3$) for each of the above steps. The amplitudes of the vibrator 28 includes an amplitude (zero or $A_0$) at the start of each step and an amplitude (zero or $A_0$) at the end of the each step. Further, the duration time $T_1$ of the expanding step is a time required for the inner pressure of the balloon 24 to reach the user-perceivable pressure after the start of inflation of the balloon 24. The duration time $T_2$ of the user perceiving step is a time during which the inner pressure of the balloon 24 is kept at the user-perceivable pressure. This duration time $T_2$ corresponds to a user-perceivable pressure duration time described earlier. The duration time $T_3$ of the contracting step is a time required from the start of deflation of the balloon 24 to the end of the deflation. Note that respective values of $A_0$, $T_1$ and $T_3$ may be set in advance during production of the communication device 200 or alternatively may be arbitrarily set by a user.

The vibrator 28 is used for notifying a user by its vibration that there occurs a change in state of an external communication device 500, and assists notification by inflation of the balloon 24. The vibrator 28 may be configured to be built in a main body (not illustrated) of the communication device 200 and cause the main body to vibrate. The vibrator 28 may be alternatively configured to be provided in contact with a part of user's body and vibrate itself. Note that the communication device 200 may be provided with a heat source section that produces heat, a power generating section that generates weak current, an air blowing section that blows air to a user, a switch section which presses a protrusion against a part of user's body, or the like, as a member for assisting notification of the change in state by use of inflation of the balloon 24.

(Method of Controlling Vibration of Vibrator by Operation Control Section)

Next, the following discusses a method of controlling vibration of the vibrator 28 by the operation control section 13. First, on receipt of state change information by the information receiving section 11 as a trigger, the expansion control section 12 starts inflation of the balloon 24 (start of the expanding step) and at the same time, the operation control section 13 starts vibration of the vibrator 28. Then, the operation control section 13 controls vibration of the vibrator 28 such that: an amplitude of the vibration of the vibrator 28 increases in proportion to an elapsed time; and the amplitude reaches $A_0$ at a time point at which the duration time $T_1$ of the expanding step has elapsed. Next, the operation control section 13 causes the vibrator 28 to stay vibrating in a state in which the amplitude is kept at $A_0$ in the user perceiving step. Then, the operation control section 13 controls the vibration of the vibrator 28 such that the amplitude of the vibration of the vibrator 28 decreases in proportion to an elapsed time from a time point at which the duration time $T_2$ of the user perceiving step has elapsed (the start of the contracting step). Finally, the operation control section 13 controls the vibration of the vibrator 28 such that the amplitude of the vibration of the vibrator 28 becomes zero at a time point at which the duration time $T_3$ of the contracting step has elapsed.

Note that the method of controlling vibration of the vibrator 28 by the operation control section 13 is not limited to the above method. For example, in the expanding step, the amplitude of vibration of the vibrator 28 may be gently increased in an early stage of the expanding step and then sharply increased in a terminal stage of the expanding step. Meanwhile, in the contracting step, the amplitude of vibration of the vibrator 28 may be gently decreased in an early stage of the contracting step and then sharply decreased in a terminal stage of the contracting step. Further, the vibration of the vibrator 28 may be configured to start or stop at a time point at which a predetermined time (which may be set in advance or arbitrarily set by a user) has elapsed from the start of the expanding step, or alternatively at the time point at which a predetermined time has elapsed from the start of the contracting step. Furthermore, in the user perceiving step, the amplitude of vibration of the vibrator 28 may be varied like a pulse so that a vibratory motion will be emphasized. Further, the vibrator 28 may be vibrated only in the user perceiving step. In this case, the duration time $T_2$ of the user perceiving step does not need to be equal to the user-perceivable pressure duration time, and for example, the duration time $T_2$ may be set shorter than the user-perceivable pressure duration time. It is also possible to employ two or more of the above methods in combination.

(Method of Controlling Inflation/Deflation of Balloon and Vibration of Vibrator by State Change Notification Device)

The following will discuss a method of controlling inflation/deflation of the balloon 24 and vibration of the vibrator 28 by the state change notification device 2, with reference to FIG. 6. FIG. 6 is a flowchart showing the control method. Note that processing in S200 of FIG. 6 is the similar to that in S100 of FIG. 4, and therefore a description thereof will be omitted.

As shown in FIG. 6, in a case where the expansion control section 12 receives, from the information receiving section 11, a determination result that informs reception of state change information, the expansion control section 12 causes the micro-blower 25 to inject air into the balloon 24, so that the balloon 24 is inflated (S201). Meanwhile, in a case where the operation control section 13 receives the above determination result from the information receiving section 11, the operation control section 13 causes the vibrator 28 to start vibrating at the same time as the balloon 24 starts to inflate, so that the vibrator 28 is caused to vibrate in a vibration pattern of the expanding step (S201). Next, the operation control section 13 determines whether or not the duration time $T_1$ of the expanding step has elapsed (S202). Note that at a point at which processing in S202 starts, the expansion control section 12 is inflating the balloon 24 such that the inner pressure of the balloon 24 increases toward the user-perceivable pressure. Then, in a case where a determination result in S202 is Y, the operation control section 13 causes the vibrator 28 to vibrate in a vibration pattern of the user perceiving step (S203). Conversely, in a case where the determination result in S202 is N, the operation control section 13 determines again whether or not the duration time $T_1$ has elapsed. Subsequently, the operation control section 13 determines whether or not the duration time $T_2$ of the user perceiving step has elapsed (S204). In a case where a determination result in S204 is Y, the operation control section 13 causes the vibrator 28 to vibrate in a vibration pattern of the contracting step (S205) and at the same time, transmits, to the contraction control section 14, a determination result that informs elapse of the duration time $T_2$. Since the duration time $T_2$ is equal to the user-perceivable pressure duration time, the contraction control section 14 having received the determination result causes the micro-blower 25 to operate so as to eject the air from inside the balloon 24, so that the balloon 24 deflates (S205).

(Effects)

As described above, Embodiment 2 allows a user to be notified of a change in state of the external communication device 500 by causing the vibrator 28 to vibrate even in a case where it is difficult to notify the change in state to the user only by expansion of the balloon 24. This makes it possible not only to protect user's privacy but also to reliably notify a user of a change in state of the external communication device 500.

Embodiment 3

The following discusses another embodiment of the present invention, with reference to FIGS. 1, 7 and 8. Note that for convenience of description, each member having the same function as a member described in the above Embodiment 1 or 2 will be given the same reference sign as the member described in Embodiment 1 or 2, and a description thereof will be omitted.

A state change notification device 3 in accordance with Embodiment 3 is different from the state information notification devices 1 and 2 in accordance with Embodiments 1 and 2, in that an expansion control section 12 and an operation control section 13 change an aspect of inflation of a balloon 24 and an aspect of vibration of a vibrator 28, in accordance with a type of change in state of an external communication device 500. Further, as illustrated in FIG. 1, a wristwatch-type communication device 300 (wearable communication device) in accordance with Embodiment 3 is different from the wristwatch-type communication devices 100 and 200 in accordance with Embodiments 1 and 2, in that the wristwatch-type communication device 300 includes a state change notification table 26b that is stored in a storage section 26.

(Aspect of Inflation of Balloon and Aspect of Vibration of Vibrator, in Accordance with Type of Change in State of External Communication Device)

The following discusses an aspect of inflation of the balloon 24 and an aspect of vibration of a vibrator 28, in accordance with a type of change in state of the external communication device 500. FIG. 7 shows an example of the state change notification table 26b stored in the storage section 26.

The state change notification table 26b is a data table showing each correspondence relationship of a change in state of the external communication device 500, a pressure increase rate and a user-perceivable pressure of the balloon 24, and an amplitude and a frequency of vibration of the vibrator 28. The correspondence relationship is established in accordance with a type of change in state, concretely, a level of necessity of user's action in response to the change in state of the external communication device 500. For example, in a case where the change in state of the external communication device 500 corresponds to voice call reception, the expansion control section 12 causes a micro-blower 25 to operate so as to inject air into the balloon 24 so that the balloon 24 will be inflated. In this case, an inner pressure of the balloon 24 is increased at a pressure increase rate $P_{11}$, until the inner pressure reaches a user-perceivable pressure $P_{21}$. The pressure increase rate is an amount of increase in inner pressure of the balloon 24 per unit time. Further, the operation control section 13 causes the vibrator 28 to vibrate at an amplitude $A_1$ and a frequency $f_1$ from a time point at which the inner pressure of the balloon 24 has reached the user-perceivable pressure $P_{21}$. Then, when a user-perceivable pressure duration time has elapsed, the operation control section 13 stops vibration of the vibrator 28. In cases where the change in state of the external communication device 500 is a change in state other than the voice call reception, the balloon 24 are inflated at a different pressure increase rate and a different user-perceivable pressure and the vibrator 28 is vibrated at a different amplitude and a different frequency.

In the above cases, respective values of the pressure increase rate, the user-perceivable pressure, the amplitude and the frequency are set in accordance with a level of necessity of user's action in response to a change in state of the external communication device 500. For example, in a case where a change in state corresponds to voice call reception, sounding of an alarm or decrease in remaining battery level, generally, a prompt action of a user is required. Accordingly, the above values are set high for such changes. In contrary, in a case where a change in state corresponds to mail reception, or gripping of the external communication device 500, in general, a prompt action of a user is not required. Accordingly, the above values are set low for such changes. In view of the above, in FIG. 7, the level of necessity is the highest in the case of "voice call reception", and accordingly, respective values of the pressure increase rate $P_{11}$, the user-perceivable pressure $P_{21}$, the amplitude $A_1$ and the frequency $f_1$ are the highest among values shown in FIG. 7. Further, the level of necessity decreases in the order of "sounding of an alarm", "decrease in remaining battery level", "mail reception", and "gripping", and the above values also decreases in the order of "sounding of an alarm", "decrease in remaining battery level", "mail reception", and "gripping". However, since the order of the level of necessity largely depends on each user, the order is not limited to the above order. On this account, though the respective values of the pressure increase rate, the user-perceivable pressure, the amplitude and the frequency may be set in advance during production of the communication device 300, it is preferable to allow a user to arbitrarily set the above values.

Note that the respective values of the pressure increase rate, the user-perceivable pressure, the amplitude and the frequency do not necessarily need to be set in accordance with the level of necessity of user's action in response to a change in state of the external communication device 500. For example, the values may be arbitrarily set simply in accordance with preference of a user.

(Method of Controlling Inflation/Deflation of Balloon and Vibration of Vibrator by State Change Notification Device)

Next, the following discusses a control method of inflation/deflation of the balloon 24 and vibration of the vibrator 28 by the state change notification device 3, with reference to FIG. 8. FIG. 8 is a flowchart showing the above control method. Note that processing in S300 of FIG. 8 is similar to the processing in each of S100 in FIG. 4 and S200 in FIG. 6, and therefore, a description thereof will be omitted.

As shown in FIG. 8, in a case where the expansion control section 12 receives, from an information receiving section 11, a determination result that informs reception of state change information, the expansion control section 12 decides a pressure increase rate and a user-perceivable pressure of the balloon 24 in accordance with the state change information, with reference to the state change notification table 26b (S301). At the same time, the operation control section 13 decides an amplitude and a frequency of the vibrator 28 in accordance with the state change information, with reference to the state change notification table 26b (S301). Then, the expansion control section 12 causes the micro-blower 25 to operate so that air will be injected into the balloon 24 at the pressure increase rate thus decided (S302).

Next, the expansion control section 12 determines whether or not the inner pressure of the balloon 24 has reached the user-perceivable pressure, on the basis of a detection result of a first pressure sensor 22 (S303). Then, in a case where a determination result in S303 is Y, the expansion control section 12 controls the operation of the micro-blower 25 so that the inner pressure of the balloon 24 will be kept at the user-perceivable pressure. Further, the expansion control section 12 transmits, to the operation control section 13, the determination result that informs that the inner pressure has reached the user-perceivable pressure. Conversely, in a case where the determination result in S303 is N, the expansion control section 12 determines again whether the inner pressure has reached the user-perceivable pressure. In a case where the operation control section 13 receives, from the expansion control section 12, the determination result that informs that the inner pressure has reached the user-perceivable pressure, the operation control section 13 causes the vibrator 28 to vibrate at the amplitude and the frequency decided above (S304).

Subsequently, the expansion control section 12 starts measuring a time at a time point at which the inner pressure of the balloon 24 has reached the user-perceivable pressure, and determines whether or not the user-perceivable pressure duration time has elapsed (S305). Then, in a case where a determination result in S305 is Y, the expansion control section 12 transmits, to the operation control section 13 and the contraction control section 14, the determination result that informs elapse of the user-perceivable pressure duration time. Conversely, in a case where the determination result in S305 is N, the expansion control section 12 determines again whether or not the user-perceivable pressure duration time has elapsed. In a case where the operation control section 13 receives, from the expansion control section 12, the determination result that informs elapse of the user-perceivable pressure duration time, the operation control section 13 stops vibration of the vibrator 28 (S306). At the same time, the contraction control section 14 causes the micro-blower 25 to operate to eject the air from inside the balloon 24, so that the balloon 24 is deflated (S306).

Note that a method of vibrating the vibrator 28 by the operation control section 13 is not limited to the above method. For example, the method may be any of various methods as described in Embodiment 2.

(Effects)

As described above, Embodiment 3 allows a user to be more reliably notified of a change in state by not only inflating the balloon 24 but also increasing the amplitude and the frequency of the vibrator 28, in a case where the change in state requires a prompt action of the user. This allows the user to make a more appropriate action in accordance with a change in state of the external communication device 500.

Embodiment 4

The following discusses another embodiment of the present invention, with reference to FIGS. 1 and 9 to 12. Note that for convenience of description, each member having the same function as a member described in any of the above Embodiments 1 to 3 will be given the same reference sign as the member described in the Embodiment 1, 2, or 3, and a description thereof will be omitted.

A state change notification device 4 in accordance with Embodiment 4 is different from respective state change notification devices 1 to 3 in accordance with Embodiments 1 to 3, in that an expansion control section 12 controls inflation of a balloon 24 such that a first pressure increase rate is higher than a second pressure increase rate. Further, the state change notification device 4 is different from the state change notification devices 1 to 3, in that as illustrated in FIG. 1, the contraction control section 14 controls deflation of the balloon such that a first pressure decrease rate is lower than a second pressure decrease rate in the state change notification device 4. Furthermore, a wristwatch-type communication device 400 (wearable communication device) in accordance with Embodiment 4 is different from respective wristwatch-type communication devices 100 to 300 in accordance with Embodiments 1 to 3, in that the wristwatch-type communication device 400 includes a pressure table 26c that is stored in a storage section 26. In Embodiment 4, the first pressure increase rate means an amount of increase in inner pressure of the balloon 24 per unit time for a period in which the inner pressure of the balloon 24 shifts from zero to a first predetermined pressure that is lower than a user-perceivable pressure; the second pressure increase rate means an amount of increase in the inner pressure of the balloon 24 per unit time for a period in which the inner pressure of the balloon 24 shifts from the first predetermined pressure to the user-perceivable pressure; the first pressure decrease rate means an amount of decrease in the inner pressure of the balloon 24 per unit time for a period in which the inner pressure of the balloon 24 shifts from the user-perceivable pressure to a second predetermined pressure that is lower than the user-perceivable pressure; and the second pressure decrease rate means an amount of decrease in the inner pressure of the balloon 24 per unit time for a period in which the inner pressure of the balloon 24 shifts from the second predetermined pressure to zero. Then, data of the above rates, and the first predetermined pressure and the second predetermined pressure are stored in the form of the pressure table 26c in the storage section 26.

FIG. 9 is an example of the pressure table 26c. As shown in FIG. 9, the pressure table 26c includes a first pressure increase rate Pa and a first predetermined pressure $P_1$ which are associated with a case where the state of the balloon 24 is in a first step. Similarly, in the pressure table 26c, a second pressure increase rate Pb and a user-perceivable pressure $P_2$ are associated with a second step; a first pressure decrease rate Pc and a second predetermined pressure $P_3$ are associated with a third step; and a second pressure decrease rate Pd is associated with a fourth step. The first step corresponds to a first sub-step of an expanding step of the balloon 24, and in the first sub-step, the inner pressure increases from zero to the first predetermined pressure. The second step corresponds to a second sub-step of the expanding step, and in this second sub-step, the inner pressure increases from the first predetermined pressure to the user-perceivable pressure. The third step corresponds to a first sub-step of a contracting step of the balloon 24, and in this first sub-step, the inner pressure decreases from the user-perceivable pressure to the second predetermined pressure. The fourth step corresponds to a second sub-step of the contracting step, and in this second sub-step, the inner pressure decreases from the second predetermined pressure to zero.

As shown in FIG. 10, the first pressure increase rate Pa is higher in value than the second pressure increase rate Pb. Accordingly, the inner pressure of the balloon 24 increases sharply in the first step, and the inner pressure increases gently in the second step. Here, the first predetermined pressure may be set in advance or set arbitrarily by a user so as to be lower than the user-perceivable pressure. Further, as shown in FIG. 11, the first pressure decrease rate Pc is lower in value than the second pressure decrease rate Pd. Accordingly, the inner pressure of the balloon 24 decreases gently in the third step, and the inner pressure decreases sharply in the fourth step. The second predetermined pressure may also be set in advance or set arbitrarily by a user so as to be lower than the user-perceivable pressure.

Note that each of the first pressure increase rate Pa to the second pressure decrease rate Pd may also be set in advance during production of the communication device 400 in accordance with a level of demand for rapid recognition of a change in state, a request for power saving or for prevention of air discharge sound, and/or the like, or may alternatively be set arbitrarily by a user. Further, the inner pressure of the balloon 24 at a time point at which the first step starts and the inner pressure at a time point at which the fourth step ends do not necessarily need to be zero. For example, at the time point at which the first step starts, a small amount of air may be have been injected in the balloon 24, and at the time point at which the fourth step ends, a small amount of air may be remaining in the balloon 24.

(Method of Controlling Inflation and Deflation of Balloon by State Change Notification Device)

Next, the following discusses a method of controlling inflation and deflation of the balloon 24 by the state change notification device 4, with reference to FIG. 12. FIG. 12 is a flowchart illustrating such a control method. Note that processing in S400 of FIG. 12 is similar to the processing in each of S100 in FIG. 4, S200 in FIG. 6, and S300 in FIG. 8, and therefore, a description thereof will be omitted.

As shown in FIG. 12, in a case where the expansion control section 12 receives, from an information receiving section 11, a determination result that informs reception of state change information, the expansion control section 12 causes the inner pressure to increase at the first pressure increase rate, with reference to the pressure table 26c (S401). In order to increase the inner pressure here, the expansion control section 12 causes a micro-blower 25 to operate to inject air into the balloon 24. Next, the expansion control section 12 determines whether or not the inner pressure of the balloon 24 has reached the first predetermined pressure, on the basis of a detection result of a first pressure sensor (S402). In a case where a determination result in S402 is Y, the expansion control section 12 causes the inner pressure to increase at the second pressure increase rate, with reference to the pressure table 26c (S403). In order to increase the inner pressure here, the expansion control section 12 causes the micro-blower 25 to operate to inject air into the balloon 24. Conversely, in a case where the determination result in S402 is N, the expansion control section 12 determines again whether or not the inner pressure has exceeded the first predetermined pressure.

Next, the expansion control section 12 determines, on the basis of a detection result of the first pressure sensor, whether or not the inner pressure of the balloon 24 has reached the user-perceivable pressure (S404). In a case where a determination result in S404 is N, the expansion control section 12 determines again whether or not the inner pressure has reached the user-perceivable pressure. Conversely, in a case where the determination result in S404 is Y, the expansion control section 12 determines whether or not the user-perceivable pressure duration time has elapsed (S405). In a case where a determination result in S405 is Y, the contraction control section 14 receives, from the expansion control section 12, a determination result that informs elapse of the user-perceivable pressure duration time. Then, the contraction control section 14 causes the inner pressure to decrease at the first pressure decrease rate, with reference to the pressure table 26c (S406). In order to decrease the inner pressure here, the contraction control section 14 causes the micro-blower 25 to operate to eject the air from inside the balloon 24. Conversely, in a case where the determination result in S405 is N, the expansion control section 12 determines again whether or not the user-perceivable pressure duration time has elapsed. Next, the contraction control section 14 determines, on the basis of a detection result of the first pressure sensor, whether or not the inner pressure of the balloon 24 has reached the second predetermined pressure (S407). In a case where a determination result in S407 is Y, the contraction control section 14 causes the inner pressure to decrease at the second pressure decrease rate, with reference to the pressure table 26c (S408). In order to decrease the inner pressure here, the contraction control section 14 causes the micro-blower 25 to operate to eject the air from inside the balloon 24. Conversely, in a case where the determination result in S407 is N, the contraction control section 14 determines again whether the inner pressure has reached the second predetermined pressure.

Note that the method of controlling inflation and deflation of the balloon 24 in accordance with Embodiment 4 may be used in combination with control of vibration of a vibrator 28 by an operation control section 13.

(Effects)

As described above, Embodiment 4 can allow a user to more promptly recognize a change in state of the external communication device 500, if the first predetermined pressure is set to an approximate value of the user-perceivable pressure. Meanwhile, if the first predetermined pressure is set such that a difference between the first predetermined pressure and the user-perceivable pressure is large, the balloon 24 is relatively gently inflated. This makes it possible to accordingly suppress a power consumption. Further, if the second predetermined pressure is set to a value close to the user-perceivable pressure, it is possible to suppress needless inflation of the balloon 24. Meanwhile, if the second predetermined pressure is set such that a difference between the second predetermined pressure and the user-perceivable pressure is large, the balloon 24 is relatively gently deflated. This makes it possible to suppress air discharge sound caused by the balloon 24 in an early stage of deflation. This consequently makes it possible to prevent the balloon 24 from making a user feel unpleasant when the balloon 24 is contracted.

In each of the above Embodiments 1 to 4, the expansion control section 12 and the contraction control section 14 are described as separate members, respectively. However, these sections 12 and 14 may be configured integrally as one member.

Further, though each of the above Embodiments 1 to 4 has described a case where a change in state of the external communication device 500 is notified to a user, a user may also be notified of a change in state of a device in which the state change notification device (1, 2, 3, or 4) is provided. In this case, as in the case where a control section 40 of the state external communication device 500 is used to detect a change in state, a control section 10 is used to detect a change in state of the device and notifies the state change notification device (1, 2, 3, or 4) of the change. This allows a user to be notified of a change in state that has occurred in the device to which the state change notification device (1, 2, 3, or 4) is provided. Examples of such a change in state encompass not only changes in state caused by external factors such as voice call reception, mail reception, and gripping of the external communication device 500 by a user but also changes in state caused by internal factors such as sounding of an alarm, turn-on of the TV, and decrease in remaining battery level.

[Software Implementation Example]

Control blocks of the state change notification devices 1, 2, 3 and 4 (particularly, the control section 10) can be realized by a logic circuit (hardware) provided in an integrated circuit (IC chip) or the like or can be alternatively realized by software as executed by a central processing unit (CPU).

In the latter case, the state change notification devices 1, 2, 3 and 4 each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of an embodiment of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that an embodiment of the present invention can also be achieved in the form of a computer data signal in which the program is embodied via electronic transmission and which is embedded in a carrier wave.

[Main Points]

A state change notification device in accordance with Aspect 1 of the present invention is a state change notification device (1, 2, 3, or 4) for notifying a user, by use of a wearable communication device (communication device 100, 200, 300, or 400), of a change in state of a device in which an external communication device (500) or the state change notification device is provided, the state change notification device including: an information receiving section (11) for receiving state change information on a change in state in a case where the change in state occurs in the device in which the external communication device or the state change notification device is provided; and an expansion control section (12) for controlling expansion of an expandable section (balloon 24) that is provided in contact with a part of user's body in the wearable communication device, the expansion control section controlling expansion of the expandable section in accordance with the state change information received by the information receiving section, so as to cause an inner pressure of the expandable section to become a user-perceivable pressure, the user-perceivable pressure being a set pressure that allows a user to perceive expansion of the expandable section.

In the above configuration, the information receiving section receives state change information transmitted from the external communication device. Further, the expansion control section controls, in accordance with the state change information, expansion of the expandable section so that an inner pressure of the expandable section will increase to the user-perceivable pressure. The expandable section here is provided in the wearable communication device so as to be in contact with a part of user's body.

Accordingly, unlike notification of a change in state to a user by use of sound output of a buzzer or the like or light emission of an LED or the like, notification of a change in state to a user by expansion of the expandable section is not influenced by noise or brightness in a surrounding environment. Further, in the case of notification by expansion of the expandable section, a third person is unlikely to recognize the change in state. In addition, while the inner pressure of the expandable section stays the user-perceivable pressure after the inner pressure has reached the user-perceivable pressure, the user always feels a certain pressure on the part of the user's body where the wearable communication device is attached. Accordingly, it is unlikely to cause a situation similar to that which occurs in notification by vibration of a vibrator, for example, a situation in which a user who is moving by running or the like may have difficulty in feeling vibration of the vibrator due to motion of the user himself/herself in a case where notification is made by the vibration. Accordingly, it is possible not only to protect user's privacy but also to reliably notify a user of a change in state of the external communication device.

A state change notification device (1, 2, 3, or 4) in accordance with Aspect 2 of the present invention may be arranged such that in the above Aspect 1, the expansion control section (12) controls expansion of the expandable section (balloon 24) such that at least one of a pressure increase rate and the user-perceivable pressure is changed in accordance with the change in state, the pressure increase rate being an amount of increase in the inner pressure of the expandable section per unit time. In the above configuration, in a case where a change in state requires a prompt action of a user, such as a case where a remaining battery level of the external communication device decreases to a value equal to or less than a specific threshold value, the pressure increase rate or the user-perceivable pressure of the expandable section can be increased. Therefore, the user can make an appropriate action in accordance with a change in state of the external communication device.

A state change notification device (1, 2, 3, or 4) in accordance with Aspect 3 of the present invention may further include, in the above Aspect 1 or 2, an operation control section (13) for controlling, in accordance with the state change information received by the information receiving section (11), an operation of a notification assisting section (vibrator 28) for assisting notification of the change in state to the user by the expandable section (balloon 24), the notification assisting section being provided in the wearable communication device (communication device 100, 200, 300, or 400). User's sensitivity to expansion of the expandable section depends on each individual user. On this account, even in a case where the inner pressure of the expandable section reaches the user-perceivable pressure, some users may not be able to feel expansion of the expandable section. Further, there is a possibility that there occurs a situation in which a user has difficulty in feeling expansion of the expandable portion, for example, in a case where the inner pressure of the expandable portion reaches the user-perceivable pressure while the user is exercising intensely. In this regard, in the above configuration, the operation control section controls, in accordance with the state change information, an operation of the notification assisting section for assisting notification of a change in state of the external communication device to a user by the expandable section. Accordingly, even in a case where it is difficult to notify a user of a change in state by expansion of the expandable section as described above, it is possible to notify only a user of the change in state by an operation of the notification assisting section, for example, by heat generation of a heat source section. This makes it possible not only to protect user's privacy but also to more reliably notify a user of a change in state of the external communication device.

A state change notification device (1, 2, 3, or 4) in accordance with Aspect 4 of the present invention may be arranged such that, in the above Aspect 3, the notification assisting section (vibrator 28) is a vibrator (28); and the operation control section (13) controls vibration of the vibrator so as to change, in accordance with the change in state, at least either one of an amplitude and a frequency of vibration of the vibrator. In the above configuration, in a case where a change in state requires a prompt action of a user, an amplitude and a frequency of vibration of the vibrator as the notification assisting section can be increased while the expandable section is expanded. For example, in a case where a remaining battery level of the external communication device decreases to a value equal to or less than a specific threshold value, the decrease of the remaining battery level can be more reliably notified to the user by increasing an amplitude and a frequency of vibration of the vibrator in addition to expanding the expandable section. This allows a user to make a more appropriate action in accordance with a change in state of the external communication device.

A state change notification device (1, 2, 3, or 4) in accordance with Aspect 5 of the present invention may be arranged such that, in any of the above Aspects 1 to 4, the expansion control section (12) controls expansion of the expandable section (balloon 24) so as to make a first pressure increase rate higher than a second pressure increase rate, the first pressure increase rate being an amount of increase in the inner pressure of the expandable section per unit time until a time point at which the inner pressure of the expandable section reaches a first predetermined pressure that is lower than the user-perceivable pressure, and the second pressure increase rate being an amount of increase in the inner pressure of the expandable section per unit time for a period in which the inner pressure of the expandable section increases from the first predetermined pressure to the user-perceivable pressure. In the above configuration, the first pressure increase rate at which the inner pressure of the expandable section increases up to the first predetermined pressure is higher than the second pressure increase rate at which the inner pressure increases from the first predetermined pressure to the user-perceivable pressure. Accordingly, for example, if the first predetermined pressure is set to an approximate value of the user-perceivable pressure, a user can be notified more quickly of a change in state of the external communication device. Further, since the second pressure increase rate is lower than the first pressure increase rate, it is possible to accordingly suppress a power consumption required for expansion of the expandable section. This makes it possible not only to save power but also to notify a user more quickly of a change in state of the external communication device.

A state change notification device (1, 2, 3, or 4) in accordance with Aspect 6 of the present invention may further include, in any of the above Aspects 1 to 5, a contraction control section (14) for controlling contraction of the expandable section (balloon 24), the contraction control section controlling contraction of the expandable section so as to make a first pressure decrease rate lower than a second pressure decrease rate, the first pressure decrease rate being an amount of decrease in the inner pressure of the expandable section per unit time for a period in which the inner pressure of the expandable section decreases from the user-perceivable pressure to a second predetermined pressure that is lower than the user-perceivable pressure, and the second pressure decrease rate being an amount of decrease in the inner pressure of the expandable section per unit time for a period in which the inner pressure of the expandable section decreases from the second predetermined pressure.

In a case where the inner pressure of the expandable section is between the user-perceivable pressure and the second predetermined pressure, the inner pressure is high. In such a state, discharge sound of fluid having been injected into the expandable section may become large if the first pressure decrease rate is high. In this regard, in the above configuration, the contraction control section controls contraction of the expandable section such that the first pressure decrease rate is lower than the second pressure decrease rate. This makes it possible to suppress fluid discharge sound which may occur in an early stage of contraction of the expandable section, so that the expandable section, when contracted, can be prevented from making a user feel unpleasant. Further, since the second pressure decrease rate becomes higher than the first pressure decrease rate, needless expansion of the expandable section can be prevented. At the same time, it is possible to prevent a user from misrecognizing that the change in state of the external communication device is continuing though the change in state has ended.

A state change notification device (1, 2, 3, or 4) in accordance with Aspect 7 of the present invention may be arranged such that, in any of the above Aspects 1 to 6, in a case where the inner pressure of the expandable section (balloon 24) reaches a third predetermined pressure that is higher than the user-perceivable pressure, the expansion control section (12) causes the expandable section to stop expanding and the contraction control section (14) starts contraction of the expandable section. In the above configuration, the expandable section stops expanding and the inner pressure of the expandable section decreases, in a case where the inner pressure has reached the third predetermined pressure. This can prevent breakage (e.g., burst) of the expandable section which may be caused by an excessive increase of the inner pressure of the expandable section. This consequently makes it possible to ensure safety of a user. In addition, needless expansion of the expandable section can be prevented.

A wearable communication device (wristwatch-type communication device 100, 200, 300, or 400) in accordance with Aspect 8 of the present invention may include the state change notification device (1, 2, 3, or 4) in accordance with any of the above Aspects 1 to 7. This configuration makes it possible to provide a wearable communication device which is capable of not only protecting user's privacy but also reliably notifying a user of a change in state of the external communication device.

A state change notification method in accordance with Aspect 9 of the present invention may be a state change notification method for notifying a user, by use of a wearable communication device, of a change in state of a device in which an external communication device or the state change notification device is provided, the state change notification method including the steps of: receiving state change information on a change in state in a case where the change in state occurs in the device in which the external communication device or the state change notification device is provided (S100); and controlling expansion of an expandable section that is provided in contact with a part of user's body in the wearable communication device, the expansion control section controlling expansion of the expandable section in accordance with the state change information received by the information receiving section, so as to cause an inner pressure of the expandable section to become a user-perceivable pressure, the user-perceivable pressure being a set pressure that allows a user to perceive expansion of the expandable section (S101 and S102). This configuration makes it possible to provide a state change notification method capable of not only protecting user's privacy but also reliably notifying a user of a change in state of the external communication device.

The state change notification device (1, 2, 3, or 4) in accordance with each Aspect of the present invention may be realized by a computer. In this case, the scope of the present invention encompasses an expansion control program of the state change notification device which expansion control program realizing, by a computer, the state change notification device by causing the computer to function as each section provided in the state change notification device, and also encompasses a computer-readable storage medium in which the expansion control program is stored.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

An embodiment of the present invention can be applied to any aspect of wireless communication devices each having a wireless communication function.

REFERENCE SIGNS LIST 1, 2, 3, 4 state change notification device
11 information receiving section
12 expansion control section
13 operation control section
14 contraction control section
24 balloon (expandable section)
28 vibrator (notification assisting section)
100, 200, 300, 400 wristwatch-type communication device (wearable communication device)
500 external communication device

The invention claimed is:

1. A state change notification device for notifying a user, by use of a wearable communication device, of a change in state of an external communication device, the state change notification device comprising:
an information receiving circuit for receiving state change information indicating a type of a change in state in a case where the change in state occurs in the external communication device; and
an expansion control circuit for controlling expansion of an expandable circuit that is provided in contact with a part of user's body in the wearable communication device, the expansion control circuit controlling expansion of the expandable circuit in accordance with the state change information received by the information receiving circuit, so as to cause an inner pressure of the expandable circuit to become a user-perceivable pressure, the user-perceivable pressure being a set pressure that allows a user to perceive expansion of the expandable circuit.

2. The state change notification device as set forth in claim 1, wherein:
the expansion control circuit controls expansion of the expandable circuit such that at least one of a pressure increase rate and the user-perceivable pressure is changed in accordance with the change in state, the pressure increase rate being an amount of increase in the inner pressure of the expandable circuit per unit time.

3. The state change notification device as set forth in claim 1, further comprising:
an operation control circuit for controlling, in accordance with the state change information received by the information receiving circuit, an operation of a notification assisting circuit for assisting notification of the change in state to the user by the expandable circuit, the notification assisting circuit being provided in the wearable communication device.

4. The state change notification device as set forth in claim 3, wherein:
the notification assisting circuit is a vibrator; and
the operation control circuit controls vibration of the vibrator so as to change, in accordance with the change in state, at least either one of an amplitude and a frequency of vibration of the vibrator.

5. The state change notification device as set forth in claim 1, wherein:
the expansion control circuit controls expansion of the expandable circuit so as to make a first pressure increase rate higher than a second pressure increase rate,
the first pressure increase rate being an amount of increase in the inner pressure of the expandable circuit per unit time until a time point at which the inner pressure of the expandable circuit reaches a first predetermined pressure that is lower than the user-perceivable pressure, and
the second pressure increase rate being an amount of increase in the inner pressure of the expandable circuit per unit time for a period in which the inner pressure of the expandable circuit increases from the first predetermined pressure to the user-perceivable pressure.

6. The state change notification device as set forth in claim 1, further comprising:
a contraction control circuit for controlling contraction of the expandable circuit,
the contraction control circuit controlling contraction of the expandable circuit so as to make a first pressure decrease rate lower than a second pressure decrease rate,
the first pressure decrease rate being an amount of decrease in the inner pressure of the expandable circuit per unit time for a period in which the inner pressure of the expandable circuit decreases from the user-perceivable pressure to a second predetermined pressure that is lower than the user-perceivable pressure, and
the second pressure decrease rate being an amount of decrease in the inner pressure of the expandable circuit per unit time for a period in which the inner pressure of the expandable circuit decreases from the second predetermined pressure.

7. The state change notification device as set forth in claim 1, further comprising:
a contraction control circuit for controlling contraction of the expandable circuit,
in a case where the inner pressure of the expandable circuit reaches a third predetermined pressure that is higher than the user-perceivable pressure, the expansion control circuit causing the expandable circuit to stop expanding and the contraction control circuit starting contraction of the expandable circuit.

8. A wearable communication device comprising the state change notification device as set forth in claim 1.

9. A state change notification method for notifying a user, by use of a wearable communication device, of a change in state of an external communication device, the state change notification method comprising the steps of:

receiving state change information indicating a type of a change in state in a case where the change in state occurs in the external communication device; and controlling expansion of an expandable section that is provided in contact with a part of user's body in the wearable communication device, the expansion control section controlling expansion of the expandable section in accordance with the state change information received by the information receiving section, so as to cause an inner pressure of the expandable section to become a user-perceivable pressure, the user-perceivable pressure being a set pressure that allows a user to perceive expansion of the expandable section.

* * * * *